Dec. 13, 1927.

J. H. CRARY 1,652,930

INTERNAL COMBUSTION ENGINE

Filed April 6, 1927

WITNESSES
Edw. Thorpe
S. W. Foster

INVENTOR
James H. Crary
BY
ATTORNEY

Patented Dec. 13, 1927.

1,652,930

UNITED STATES PATENT OFFICE.

JAMES HOWELL CRARY, OF NEW YORK, N. Y.

INTERNAL-COMBUSTION ENGINE.

Application filed April 6, 1927. Serial No. 181,493.

This invention relates to internal combustion engines, an object of the invention being to provide an internal combustion engine of the two-cycle type, in which air alone is utilized for scavenging and a rich fuel mixture is forced into the air during the compression stroke of the piston, the admission of air and the admission of the fuel mixture being controlled positively by cams or analogous devices.

A further object is to provide an engine of this type in which the speed of the engine is to be regulated by the length of time the valves are open, which of course necessitates the return from the explosion chamber of both air and gas which may be admitted thereto.

A further object is to provide an engine of this type in which the piston functions to compress both the air and the rich fuel mixture, compressing the latter to a greater degree than the air, so that the mixture may be forced into the air while the latter is under compression in the cylinder.

With these and other objects in view, the invention consists in certain novel features of construction and combinations and arrangements of parts which will be more fully hereinafter described and pointed out in the claims.

In the accompanying drawings—

Figure 1:
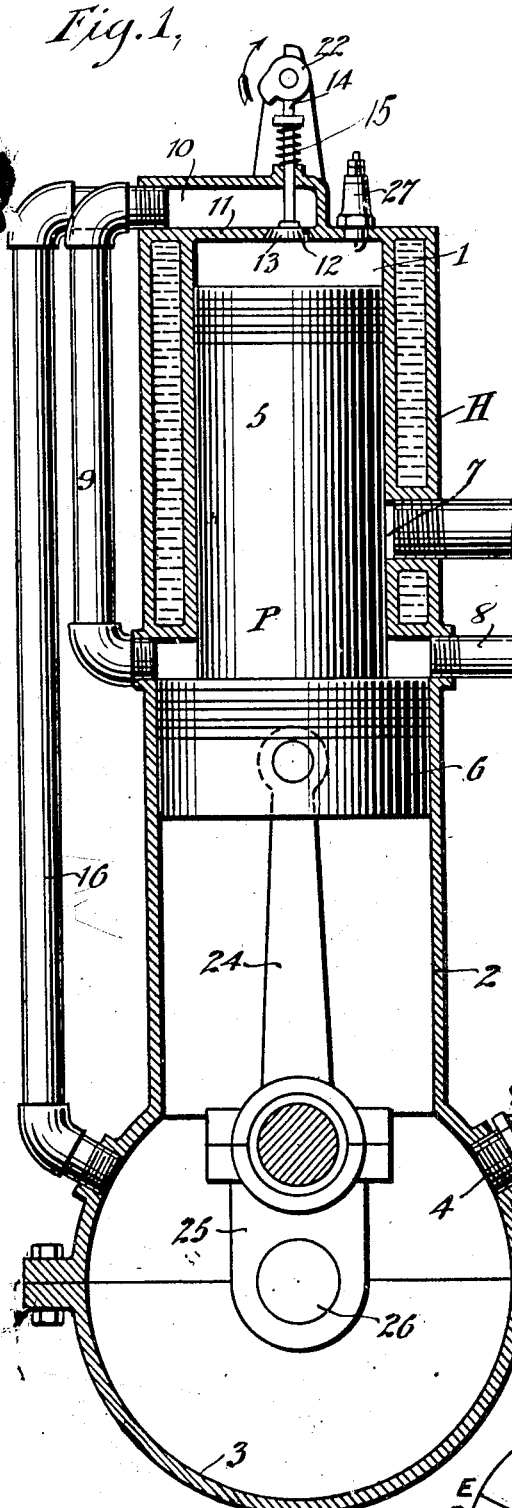
Figure 1 is a view in longitudinal section of my improved engine, showing the piston in position for firing.

H represents an engine cylinder which is of two internal diameters, the upper portion constituting the smaller diameter 1 of the cylinder and the lower portion 2 the larger diameter of the cylinder. The larger diameter end of the cylinder is secured to a crank case 3 into which air is admitted through a check valve 4.

P represents the piston of my improved engine, the upper portion 5 of which is of appreciably smaller diameter than the lower portion so that while the upper portion 5 of the piston fits the smaller diameter 1 of cylinder H, the lower larger end 6 of the piston P fits the larger end C of the cylinder.

The smaller internal diameter portion 1 of cylinder H constitutes an explosion chamber and has an exhaust port 7 near its lower end which is covered and uncovered by the piston. 8 represents a supply pipe for a rich fuel mixture which may be connected with a suitable carburetor (not shown) to supply the fuel mixture to the upper end of the lower portion 2 of cylinder H above the enlarged lower end 6 of piston P.

9 is a pipe which connects the upper end of the lower portion 2 of cylinder H with a passage 10 formed in the head 11 or upper end of the cylinder H. 12 represents a fuel inlet port which is controlled by a valve 13. This valve 13 has a stem 14 around which a coil spring 15 is located to hold the valve in closed position.

16 represents an air pipe which connects the crank case 3 with a passage 17 in the head 11, and a port 18 connects the passage 17 with the interior of the cylinder. This port 18 is controlled by a valve 19 having a stem 20 thereon, and a coil spring 21 exerts pressure on the stem 20 to normally hold the valve 19 in closed position.

22 represents a cam which is adapted to engage the stem 14 and open valve 13, and 23 is a cam which engages the stem 20 of valve 19 to open said valve. These cams 22 and 23 are so positioned and so shaped as to give the valves the proper operation, but I would have it borne in mind that it is to be understood that some means will be provided whereby the timing of the valve openings can be controlled. In other words, either cams or some means operatively connected therewith or in conjunction therewith will prevent a regulation of the length of time the valves are open, and while this is not necessary for a completely operative device it is necessary to permit a variation in the speed of the engine, as will be more fully hereinafter explained.

The piston P is connected by a connecting rod 24 with a crank arm 25 on a crank shaft 26 in case 3, and 27 represents a spark plug located in the head of the cylinder.

The operation is as follows:

It is to be understood of course that the upward stroke of the piston sucks air into the crank case 3 and compresses the fuel mixture in the upper end of the lower portion 2 of cylinder H, this fuel mixture having previously been sucked through the pipe 8 on the down stroke of the piston, the down stroke of the piston serving to compress the air in the crank case so that the movement of the piston separately compresses the air and fuel mixture, and it is to be understood that the compression of the fuel mixture is higher than that of the air for efficient operation.

Figure 2:
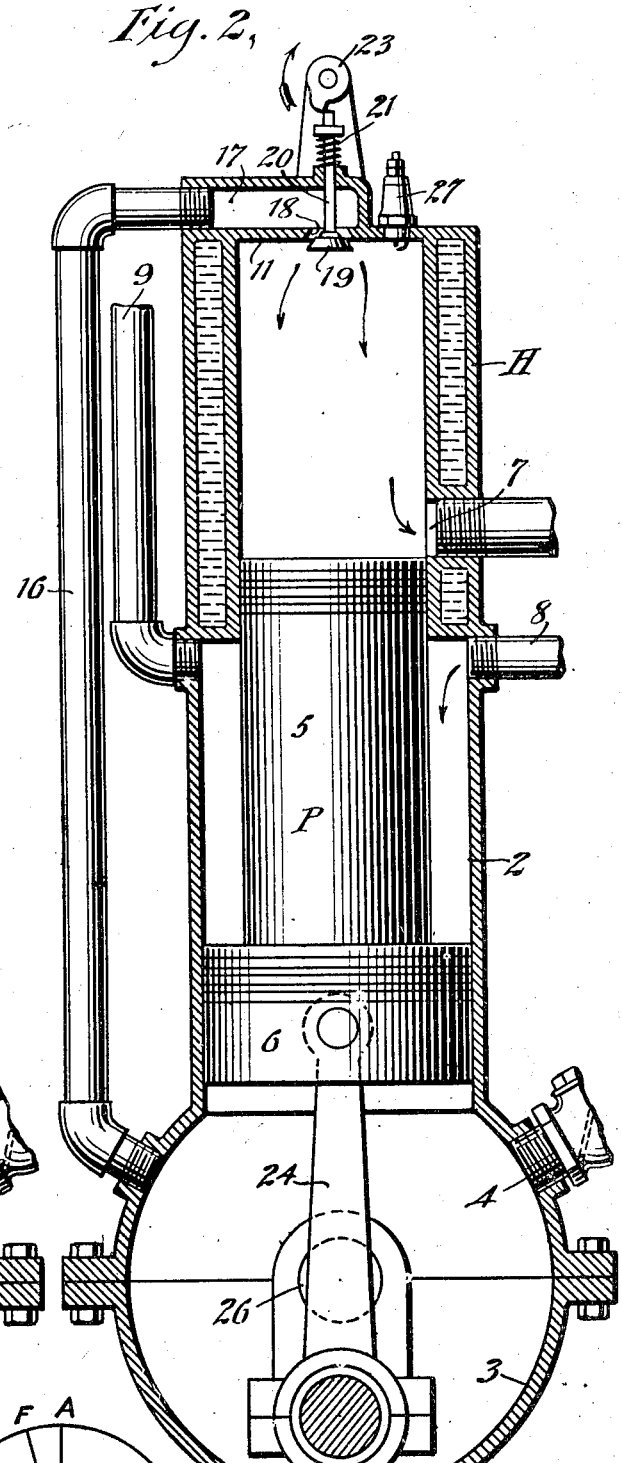
Figure 2 is a similar view, showing the piston in its other extreme position of movement.
Figure 3:
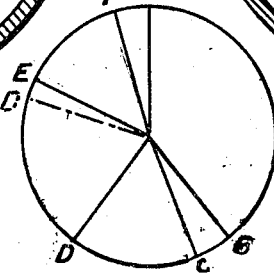
Figure 3 is a diagram illustrating the operation of the engine.

Figure 1 shows the engine with the parts in position for firing, and the mixture when the stroke of the piston takes place is forced downwardly, Figure 2 showing the extreme downward movement of the piston. Figure 3 shows diametrically the steps or phases of the operation:

Assuming that the explosion takes place at A, the working stroke extends from A to B, and from B to C the exhaust opens, both valves 13 and 19 remaining closed during this movement. From C to D the air valve 19 is open, allowing the air compressed in the crank case 3 to be forced into the upper end of the cylinder, forcing out the burnt gas and thoroughly scavenging the engine and leaving in the cylinder fresh air for a new explosion. From D to F the air valve 19 remains open, and this may vary if desired to throttle down the speed of the engine. The longer the air valve remains open the slower will be the speed of the engine as some of the air will be returned to the crank case, and hence a lesser volume and lower compression is had to reduce the power and consequently the speed of the engine. From E to F the fuel or gas mixture controlling valve 13 is open, allowing this mixture to be forced into the air and compressed with it; and from F to A both valves are closed, the compression completed and ready for again firing.

While I have illustrated what I believe to be a preferred embodiment of my invention, it is obvious that various changes and alterations might be made in the general form of the parts described without departing from my invention and hence I do not limit myself to the precise details set forth but consider myself at liberty to make such changes and alterations as fairly fall within the spirit and scope of the appended claims.

I claim:

1. A two-cycle internal combustion engine, including a cylinder of two internal diameters, a crank case communicating with the larger end of the cylinder and constituting an air chamber, a piston of two diameters, the smaller diameter fitting the internal diameters of the cylinder, the larger end of the piston constituting a compressor or plunger for compressing air in the crank case and a fuel mixture in the cylinder, said cylinder having an inlet port for the fuel mixture above the enlarged end of the piston, and said crank case having an air inlet port, said cylinder having an exhaust port near its lower end, means for conducting air and gas from the crank case and cylinder respectively to the head of the engine, and positively operated valves controlling the flow of gas and air into the engine cylinder.

2. A two-cycle internal combustion engine, including a cylinder of two internal diameters, a crank case communicating with the larger end of the cylinder and constituting an air chamber, a piston of two diameters, the smaller diameter fitting the internal diameters of the cylinder, the larger end of the piston constituting a compressor or plunger for compressing air in the crank case and a fuel mixture in the cylinder, said cylinder having an inlet port for the fuel mixture above the enlarged end of the piston, and said crank case having an air inlet port, said cylinder having an exhaust port near its lower end, means for conducting air and gas from the crank case and cylinder respectively to the head of the engine, positively operated valves controlling the flow of gas and air into the engine cylinder, a spring normally holding the valves in closed position, and cams for positively opening the valves.

3. A two-cycle internal combustion engine, including a cylinder of two internal diameters, a crank case communicating with the larger end of the cylinder and constituting an air chamber, a piston of two diameters, the smaller diameter fitting the internal diameters of the cylinder, the larger end of the piston constituting a compressor or plunger for compressing air in the crank case and a fuel mixture in the cylinder, said cylinder having an inlet port for the fuel mixture above the enlarged end of the piston, and said crank case having an air inlet port, said cylinder having an exhaust port near its lower end, means for conducting air and gas from the crank case and cylinder respectively to the head of the engine, positively operated valves controlling the flow of gas and air into the engine cylinder, a spring normally holding the valves in closed position, and cams for positively opening the valves, said cams adapted to control the time of opening of said valves.

JAMES HOWELL CRARY.